`US011900177B2`

United States Patent
Oberle

(10) Patent No.: US 11,900,177 B2
(45) Date of Patent: Feb. 13, 2024

(54) TOOL FOR MAPPING SOFTWARE OBJECTS AND APPLICATION PROGRAM INTERFACES

(71) Applicant: SAP SE, Walldorf (DE)

(72) Inventor: Daniel Oberle, Durmersheim (DE)

(73) Assignee: SAP SE, Walldorf (DE)

( * ) Notice: Subject to any disclaimer, the term of this patent is extended or adjusted under 35 U.S.C. 154(b) by 115 days.

(21) Appl. No.: 17/543,317

(22) Filed: Dec. 6, 2021

(65) Prior Publication Data

US 2023/0176930 A1 Jun. 8, 2023

(51) Int. Cl.
*G06F 9/54* (2006.01)

(52) U.S. Cl.
CPC .................... *G06F 9/541* (2013.01)

(58) Field of Classification Search
None
See application file for complete search history.

(56) References Cited

U.S. PATENT DOCUMENTS

| 9,389,928 B1* | 7/2016 | Surti ................. G06F 9/54 |
| 2013/0204884 A1* | 8/2013 | Stewart ............. G06Q 10/06 707/E17.058 |
| 2014/0095267 A1* | 4/2014 | Patil ................. G06Q 10/06 705/7.36 |
| 2014/0173448 A1* | 6/2014 | Aly ................... G06F 8/34 715/738 |
| 2022/0222335 A1* | 7/2022 | Bosch ............... G06F 21/52 |

* cited by examiner

*Primary Examiner* — Syed A Roni
(74) *Attorney, Agent, or Firm* — SCHWEGMAN LUNDBERG & WOESSNER, P.A.

(57) ABSTRACT

In an example embodiment, a graphical user interface-based software tool is provided that uses integrated process information and information of a technical infrastructure to provide automatically-analyze integrations. The tool displays a list of integrations available with one or more corresponding software products linked to the first process by the linkage, each integration in the list of integrations identifying a separate software product with a separate application program interface (API) from the first software product.

20 Claims, 8 Drawing Sheets

| BUSINESS PROCESS | ◀ INTERGRATIONS | | | |
|---|---|---|---|---|
| BUSINESS PROCESS | H2R INTEGRATIONS | | | |
| D2O DESIGN TO OPERATE | WORKFORCEPERSON REPLICATION SFSF EC 2 S/4HANA | WORKFORCEPERSON REPLICATION SFSF EC 2 S/4HANA VIA MDI | | 502 |
| H2R HIRE TO RETIRE | DETAILS EXTENSIBLE | BUSINESS OBJECTS APIS | | |
| L2O TRAVEL TO REIMBURSE | COSTCENTER REPLICATION S/4HANA 2 SFSF | NAME | PRODUCT | EXTENSIBLE |
| | DETAILS EXTENSIBLE | WORKFORCEASSIGNMENT | S/4HANA CLOUD | WORKFORCEASSIGNMENT, WO |
| T2R LEAD TO CASH | ... | PERSON | SFSF EC | HRIS ELEMENT TYPES: PERSO |
| S2P SOURCE TO PAY | | WORKFORCEPERSON | MDI ONEMDS | WORKFORCEPERSON, WORKAS |
| | | APIS | | |

*FIG. 5*

TOOL FOR MAPPING SOFTWARE OBJECTS AND APPLICATION PROGRAM INTERFACES

BACKGROUND

Some software companies offer a variety of products and applications that may be integrated in some way with each other (e.g., data may be shared, objects existing in one product may be accessible in another, etc.).

BRIEF DESCRIPTION OF DRAWINGS

The present disclosure is illustrated by way of example and not limitation in the figures of the accompanying drawings, in which like references indicate similar elements.

FIG. 5 is a screen capture illustrating an additional screen including another additional section of the extension implementation tool, in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

When software companies provide various products, these products may be integrated with each other to allow users to preform processes with multiple products. The integrations differ in their middleware and application program interfaces (APIs), thus making it difficult for users to determine which integrations are working in a specific process step when a user wants to extend an integration scenario/dataflow.

Thus, a series of questions may arise in such system:
1. Which products work in which process/step?
2. Which integrations (e.g., replication of data) work in a process/step?
3. Which integration technology is used?
4. Is the integration extensible (e.g., by a custom field extending a software object)?
5. Which software objects are relevant to which product?
6. Which APIs are called/used in an integration
7. Are the APIs extensible?

In an example embodiment, a tool is provided that facilitates answering these questions. More particularly, it enables users who are unfamiliar with the integration scenario to assess and implement an extension requirement.

In an example embodiment, the provided tool uses integrated process information and information of a technical infrastructure to provide automatically-analyzed integrations. There are several current approaches to capturing information relevant to the above questions available within a computer system, but each of them only captures a fragment of the information that will be utilized and they are not linked. Additionally, most of them do not include extensibility information. The provided tool solves these issues.

Figure 1:
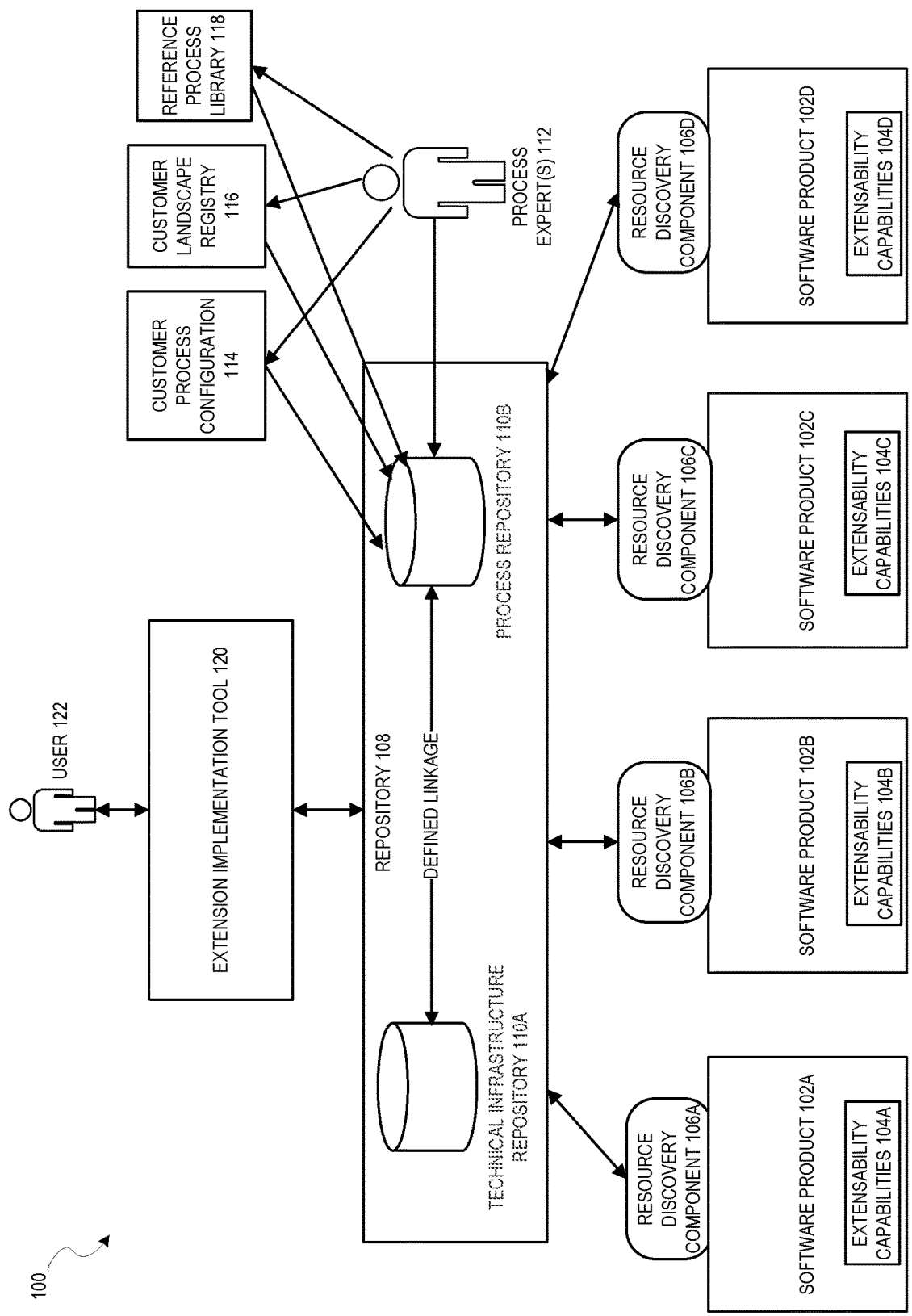
FIG. 1 is a block diagram illustrating a system for linking software objects and APIs, in accordance with an example embodiment.

In an example embodiment, the provided tool is realized in a distributed environment. FIG. 1 is a block diagram illustrating a system 100 for linking software objects and APIs, in accordance with an example embodiment.

In this example, software products 102A, 102B, 102C, 102D are different products but ones that may have at least partial integration with each other; namely that some aspects of the software products 102A, 102B, 102C, 102D, whether it is data, data formats/schemas, configurations, or other aspects are potentially shared with one another. One example of a software product is a Human Capital Management (HCM) product such as SuccessFactors™ from SAP SE, of Walldorf, Germany. HCM is a set of practices related to people resource management, such as workforce acquisition, workforce management, and workforce optimization, and an HCM product is typically cloud-based software providing tools to perform such practices.

Another example of a software product is travel and expense management software, such as Concur from SAP SE of Walldorf, Germany. Another example of a software product is an Enterprise Resource Planning (ERP) software, such as S/4/HANA™ from SAP SE of Walldorf Germany.

Each software product 102A, 102B, 102C, 102D may have a set of extensibility capabilities 104A, 104B, 104C, 104D. An extensibility capability is an ability to extend either a software object or an API. The extensibility capabilities 104A, 104B, 104C, 104D may be formally captured in the corresponding software product 102A, 102B, 102C, 102D. For example, product 102C may formalize the extensibility capabilities 104C in a registry.

Each software product 102A, 102B, 102C, 102D may include a resource discovery component 106A, 106B, 106C, 106D. Each resource discovery component 106A, 106B, 106C, 106D may provide a set of process, such as an API, that allows an outside entity to query a software product 102A, 102B, 102D, 102D to receive a list of that software product's capabilities. For example, software product 102C can be asked via resource discovery component 106C which software objects or APIs software product 102C supports. In an example embodiment, the resource discovery component 106A, 106B, 106C, 106D also provides a mechanism to query a software product's extensibility capabilities.

Notably, resource discovery components 106A, 106B, 106C, 106D are identical to each other, or at least similar enough that the output for a query for extensibility capabilities 104A, 104B, 104C, 104D in different software products 102A, 102B, 102C, 102D are in the same formal format.

Queries to the resource discovery components 106A, 106B, 106C, 106D come from the repository 108. Repository 108 may include a technical infrastructure repository 110A and a process information repository 110B. The response(s) to the query (which may include capabilities of software objects and/or APIs of the software products 102A, 102B, 102C, 102D as well as extensibility capabilities 104A, 105B, 104C, 104D) is/are stored in the technical infrastructure repository 110A.

Resource discovery components 106A, 106B, 106C, 106C provide resource discovery information to requesting entities/processes. Resource discovery information can have different scopes of views. System instance aware information describes the state of a specific system instance at run-time, potentially reflecting customizations. System instance aware information may differ between system instances, depending on the tenant specific customizability of them. System instance unaware information, on the other hand, are identical across all system instances of the described system type. Cross-system information is shared between multiple system types. Most notably, this applies to a resource discovery taxonomy.

Resource discovery information can also be categorized into resources and taxonomies. Resource discovery resource information describes application and service resources, such as API resources and event resources. It may also be system instance aware, depending on the implementation of the system type.

The resource discovery taxonomy is used to categorize and structure resources. Taxonomies span across products and system types, and thus may be considered cross-system information. Some taxonomies may be implemented as dedicated entities that can express additional information, while other taxonomies are provided via fixed enums (code lists) and are defined as part of resource discovery itself, such as tags.

Resource discovery behavior standardizes how resource discovery information is discovered, transported, and aggregated.

A system type is an abstract type of an application or service. A system installation is a concrete running instance of a system type. If the system type supports tenant isolation, a system installation may offer multiple system instances.

A resource is provided by or for a system instance for outside consumption and/or communication. As such, the resource discovery components 106A, 106B, 106C, 106D may be considered resources in this contexts, although under some circumstances they may be considered system instances or installations.

There are multiple different ways the resource discovery components 106A, 106B, 106C, 106D can communicate with requesters. One way is a pull transport mode. Here, resource discovery information is made available through a Representational State Transfer (REST) API that exposes resource discovery documents via endpoints. Here, the API is made available to requesters. This has the benefit of a decentralized approach, but periodic polling can reduce operational efficiency, slowing information updates. Another potential approach is a push transport, where the document is pushed to a requester via a webhook, a Hypertext Transfer Protocol (HTTP) POST endpoint, or a file upload. Another potential approach is an import transport, where a resource discovery document is stored as a JavaScript™ Object Notation (JSON) file. Another potential approach is event-driven transport, which uses a publish/subscribe or distributed log pattern.

Figure 2:
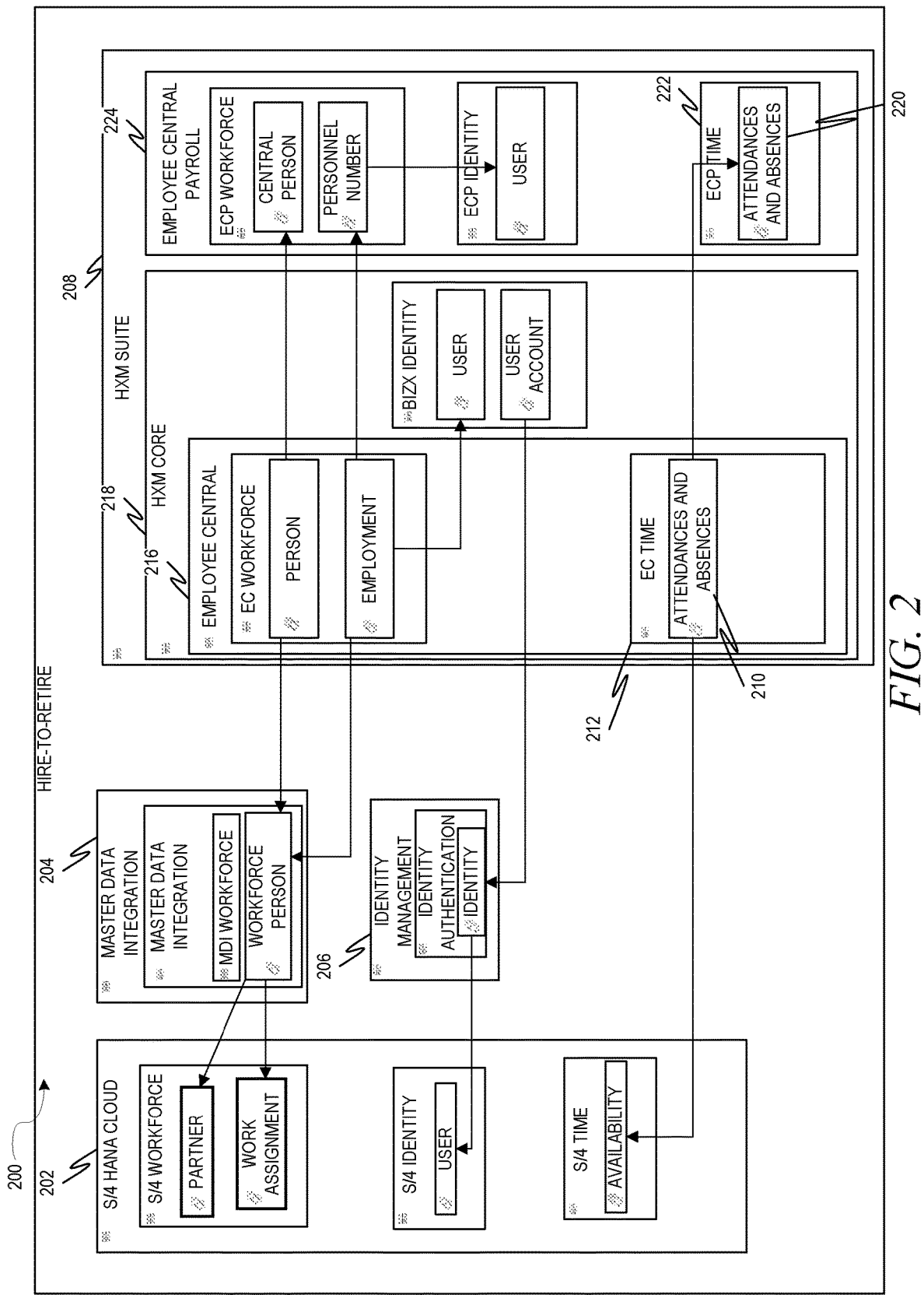
FIG. 2 is a screen capture illustrating a process tool in accordance with an example embodiment.

Meanwhile, one or more process experts 112 maintain process information stored in process information repository 110B. This may involve drawing process steps in a process tool. FIG. 2 is a screen capture illustrating a process tool 200 in accordance with an example embodiment. The process steps are drawn using the process tool 200, and these steps are linked in a flow diagram. Here, the process being defined is a "Hire to Retire" process. Four software products are used during this process, specifically S/4 HANA Cloud™ 202, Master Data Integration 204, Identity Management 206, and HXM Suite 208. Each of these software products has software components that include process components, and the edges between process components describe flows. For example, the attendees and absences object 210 within the EC Time component 212 within the Employee Central component 216 within the HXM Core 218 within HXM Suite 208 transfers data regarding user attendances and absences to the attendances and absences object 220 inside the ECP Time component 222 within the employee central payroll component 224 within HXM Suite 208.

The process tool 200 also allow the process experts 112 to modify the process steps, such as by splitting them, moving elements around, etc.

An example of such process steps includes steps for acquiring an employee, training an employee, and retiring an employee. The one or more process experts 112 then also define the linkage between those process steps and software products stored in the technical infrastructure repository 110A.

In an example embodiment, these definitions may be partially or completed imported from additional software tools that aid in defining the process steps and/or providing the linkage between process steps and software products. These additional tools include customer process configuration 114, customer landscape registry 116, and reference process library 118. Customer process configuration 114 contains information about reference processes, focusing on design-time. Customer Landscape Registry 116 focuses on runtime and concrete customer landscapes. It contains information about live integrations, wirings, concrete dependencies and dataflows, tracing, and process detections. Reference Process Library 118 is a software tool that captures reference models of large processes. For example, there may be a process model for H2R (Hire2Retire) where one may find a "Replicate WorkforcePerson" process step. Reference Process Library 118 may also capture which products work in the business process steps at design time, as a type of reference model.

The technical infrastructure repository 110A and a process information repository 110B are linked, in that individual pieces of technical infrastructure information (obtained from the resource discovery components 106A, 106B, 106C, 106D) are linked with individual processes.

Figure 3:
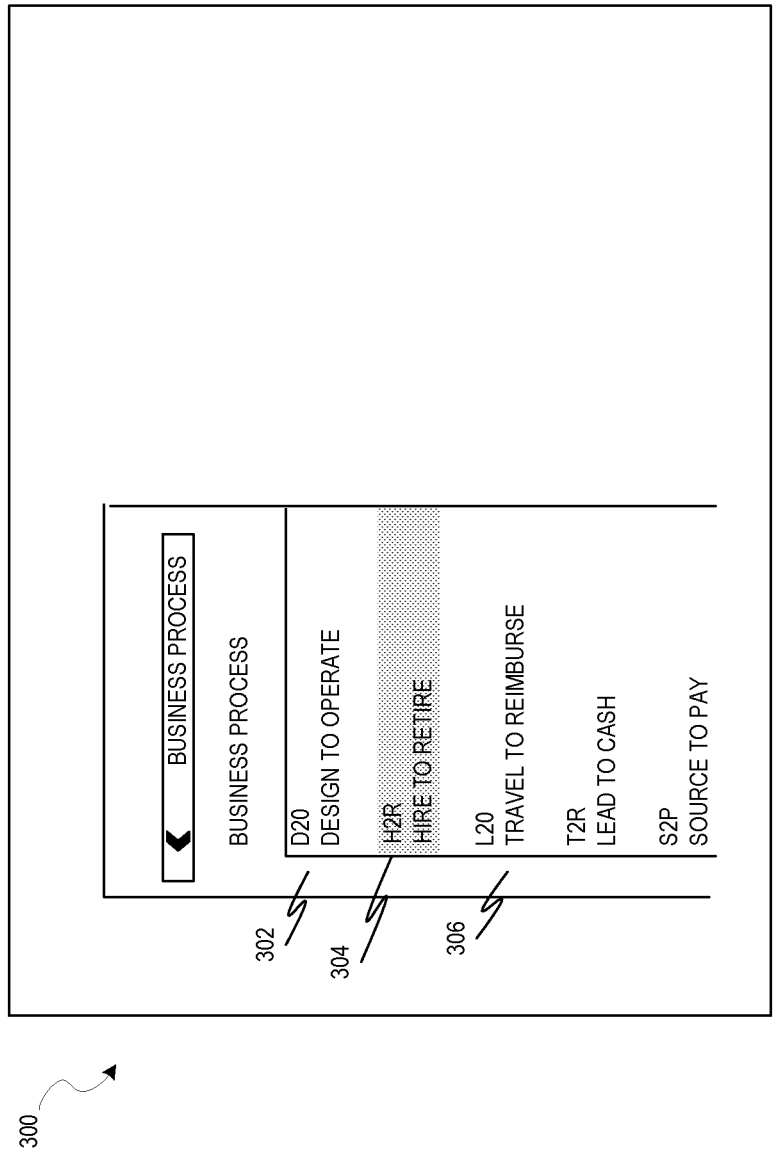
FIG. 3 is a screen capture depicting a starting point screen of the extension implementation tool, in accordance with an example embodiment.

An extension implementation tool 120 then allows a user 122, who may have a technical role but may be unfamiliar with an integration scenario, to assess and implement the extension requirement. More particularly, the tool 120 bridges the gap between the process information from the process experts 112 and the technical infrastructure from the software products 102A-102D, and provides the user 122 with a visual way to understand which integrations are extensible and how. FIG. 3 is a screen capture depicting a starting point screen 300 of the extension implementation tool 120, in accordance with an example embodiment. Here, the user can see a list of high level processes, such as Design to Operate (D2O) 302, Hire to Retire (H2R) 304, and Lead to Cash (L2C) 306. Assume the user clicks on H2R 304. At this stage an additional section opens which displays the possible integrations.

Figure 4:
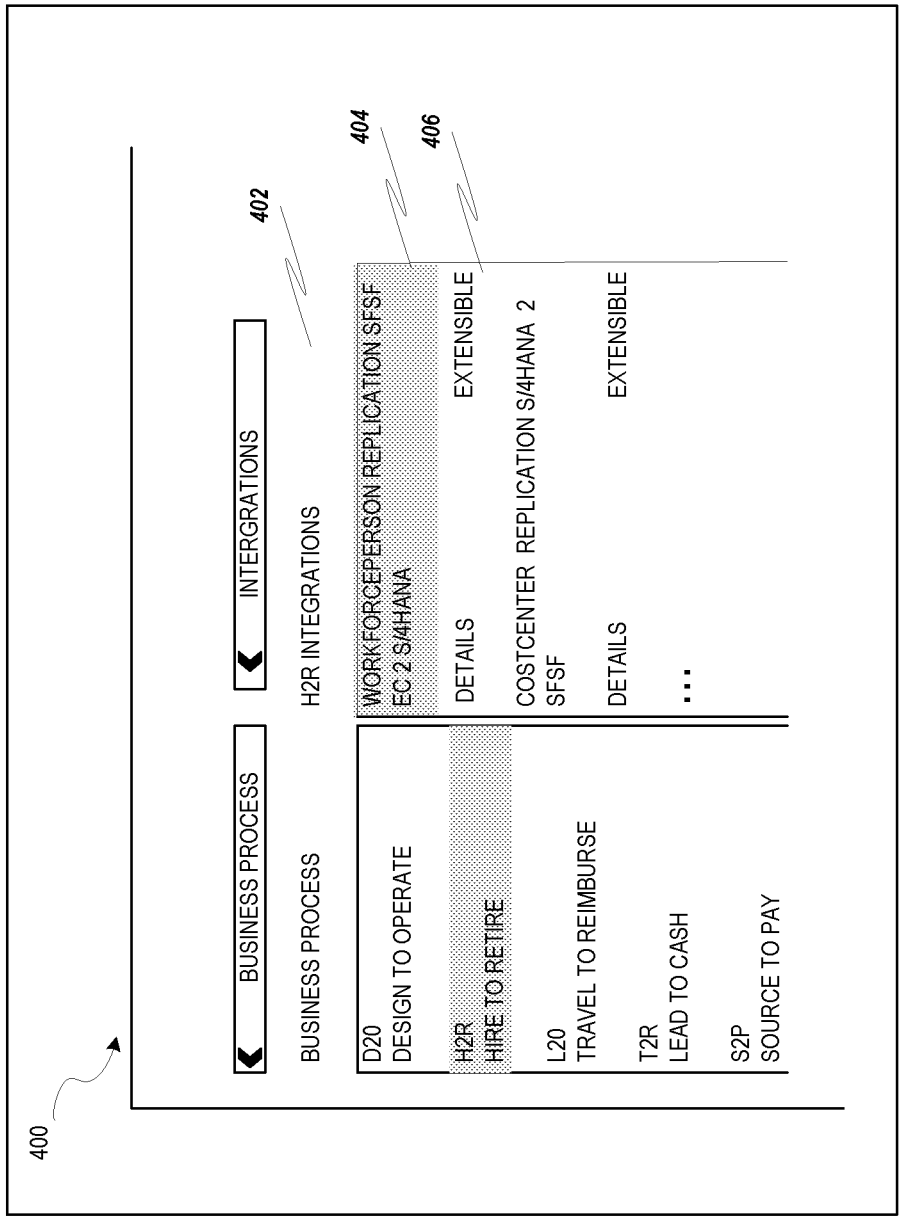
FIG. 4 is a screen capture depicting an additional screen including the additional section of the extension implementation tool, in accordance with an example embodiment.

FIG. 4 is a screen capture depicting an additional screen 400 including the additional section 402 of the extension implementation tool 120, in accordance with an example embodiment. Here, the user learns which software products work within the H2R 304 process and how they are integrated. For example, the replication 404 of WorkforcePersons between SuccessFactors™ Employee Central (SF SF EC) and S/4HANA™, or the replication 406 of CostCenters between S/4 HANA™ and SuccessFactors™.

The extension implementation tool 120 also shows which of the integrations are extensible. Suppose the organization to which the user belongs would like to introduce an extension field on WorkforcePerson. Then, the organization needs to figure out if the corresponding replication 404 of WorkforcePerson between SuccessFactors™ and S/4 HANA™ is also extensible. This fact is displayed in the additional section 402 (notably it indicates that the replication 404 is indeed extensible). The question then is whether the integration content or middleware and the corresponding APIs can also incorporate/expose the extension field.

Suppose the user clicks on "WorkforcePerson Replication SF SF EC 2 S/4 HANA™." At that point, another section is revealed on the extension implementation tool 120. FIG. 5 is a screen capture illustrating an additional screen 500 including another additional section 502 of the extension implementation tool 120, in accordance with an example embodiment. This additional section 502 highlights several details regarding the integration. First, the user learns that SF SF EC and S/4 HANA™ are integrated via Master Data Integration (DMI). Second, "WorkforcePerson" is represented differently in S/4 HANA™, SFSF EC, and MDI, respectfully. In S/4 HANA™, "WorkforcePerson" is represented by the "Person" business object. MDI is already abstract from product-specific business objects and uses an aligned data model. For each of the software objects, the extension implementation tool 120 lists whether and how extension fields can be attached (column "Extensible"). Third, the user can learn which inbound and outbound APIs of the individual products are called in this integration. The corresponding table, which is not fully shown in FIG. 5, provides a link to the corresponding API on a hub and information about whether extension fields can be exposed.

Figure 6:
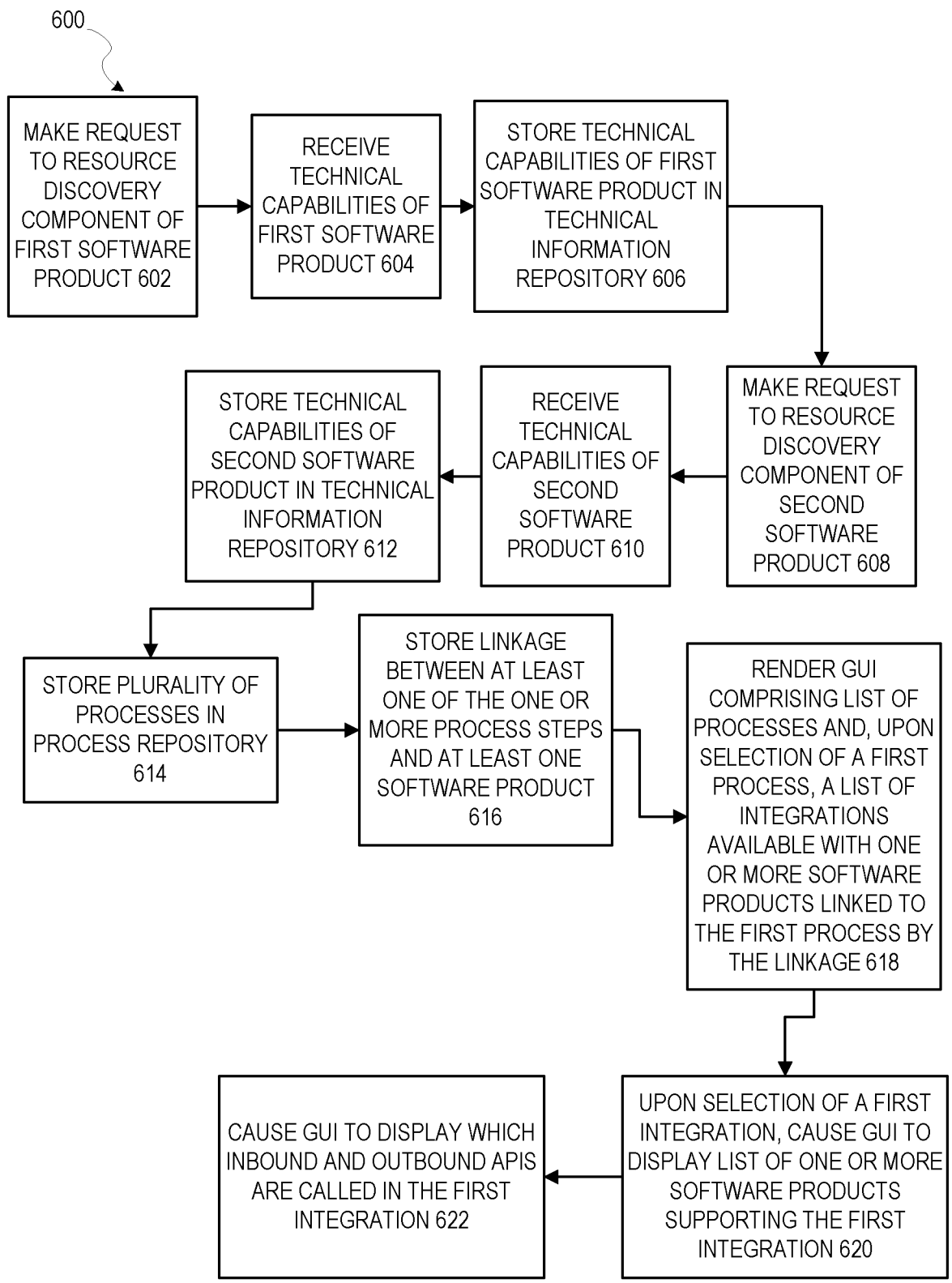
FIG. 6 is a flow diagram illustrating a method for linking process steps to software products in accordance with an example embodiment.

FIG. 6 is a flow diagram illustrating a method 600 for linking process steps to software products in accordance with an example embodiment. At operation 602, a request is made to a resource discovery component of a first software product for technical capabilities of the first software product. At operation 604, the technical capabilities of the first software product are received from the resource discovery component of the first software product. This information regarding technical capabilities includes extensibility capabilities, such as indications of which fields within the tables of the first software product are extensible, such as via custom fields. This information is also contained in a standardized format, such as a resource discovery document. In an example embodiment, this information is stored in JSON format. At operation 606, the technical capabilities of the first software product are stored in a technical information repository.

At operation 608, a request is made to a resource discovery component of a second software product for technical capabilities of the second software product. At operation 610, the technical capabilities of the second software product are received from the resource discovery component of the second software product. This information regarding technical capabilities includes extensibility capabilities, such as indications of which fields within the tables of the second software product are extensible, such as via custom fields. This information is also contained in the same format as the information regarding technical capabilities of the first software product. At operation 612, the technical capabilities of the second software product are stored in a technical information repository.

At operation 614, a plurality of processes are stored in a process repository. Each of these processes may include one or more process steps. In one example embodiment, these processes are partially or fully defined by a process expert using a process tool. The processes may be stored as flow diagrams, and indicate process objects and how the process objects send data to other process objects in the process. In an example embodiment, these processes may be partially or fully imported from an additional software tool, such as a customer process configuration, customer landscape registry, or reference process library.

At operation 616, a linkage between at least one of the one or more process steps stored in the process repository and at least one software product whose technical capabilities are stored in the technical information repository. At operation 618, based on the technical capabilities stored in the technical information repository, the plurality of processes stored in the process repository, and the defined linkage, a graphical user interface comprising a list of processes and, upon selection of a first process in the list of processes, a list of integrations available with one or more corresponding software products linked to the first process by the linkage are rendered on a display.

At operation 620, upon selection of a first integration from the list of integrations, the graphical user interface is caused to display a list of one or more software products supporting the first integration, based on the technical capabilities stored in the technical information repository. At operation 622, the graphical user interface is caused to display which inbound and outbound Application Program Interfaces (APIs) are called in the first integration, based on the technical capabilities stored in the technical information repository.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
  at least one hardware processor; and
  a computer-readable medium storing instructions that, when executed by the at least one hardware processor, cause the at least one hardware processor to perform operations comprising:
    requesting, from a resource discovery component of a first software product, information regarding technical capabilities of the first software product;
    receiving, from the resource discovery component of the first software product, the information, in a standardized format, regarding technical capabilities, including extensibility capabilities, of the first software product;
    storing the technical capabilities of the first software product in a technical infrastructure repository;
    storing a plurality of processes in a process repository, each of the processes including one or more process steps;

defining a linkage between at least one of the one or more process steps stored in the process repository and at least one software product whose technical capabilities are stored in the technical information repository; and based on the technical capabilities stored in the technical information repository, the plurality of processes stored in the process repository, and the defined linkage, causing display of a graphical user interface comprising a list of processes and, upon selection of a first process in the list of processes, a list of integrations available with one or more corresponding software products linked to the first process by the linkage.

Example 2. The system of Example 1, wherein the operations further comprise:

requesting, from a resource discovery component of a second software product, information regarding technical capabilities of the second software product;

receiving, from the resource discovery component of the second software product, the information, in a standardized format, regarding technical capabilities, including extensibility capabilities, of the second software product; and storing the technical capabilities of the second software product in the technical infrastructure repository.

Example 3. The system of Example 1 or 2, wherein the list of integrations further indicates whether each corresponding software product is extensible, based on the extensibility capabilities stored in the technical information repository.

Example 4. The system of any of Examples 1-3, wherein the operations further comprise:

upon selection of a first integration from the list of integrations, causing the graphical user interface to display a list of one or more software products supporting the first integration, based on the technical capabilities stored in the technical information repository.

Example 5. The system of Example 4, wherein the operations further comprise:

causing the graphical user interface to display, for each of the one or more software products in the list of one or more software products supporting the first integration, whether and how extension fields can be attached.

Example 6. The system of Example 4, wherein the operations further comprise:

causing the graphical user interface to display which inbound and outbound Application Program Interfaces (APIs) are called in the first integration, based on the technical capabilities stored in the technical information repository.

Example 7. The system of any of Examples 1-6, wherein the technical capabilities are stored as a JavaScript Object Notation (JSON) file.

Example 8. A method comprising:

requesting, from a resource discovery component of a first software product, information regarding technical capabilities of the first software product;

receiving, from the resource discovery component of the first software product, the information, in a standardized format, regarding technical capabilities, including extensibility capabilities, of the first software product;

storing the technical capabilities of the first software product in a technical infrastructure repository;

storing a plurality of processes in a process repository, each of the processes including one or more process steps;

defining a linkage between at least one of the one or more process steps stored in the process repository and at least one software product whose technical capabilities are stored in the technical information repository; and based on the technical capabilities stored in the technical information repository, the plurality of processes stored in the process repository, and the defined linkage, causing display of a display a graphical user interface comprising a list of processes and, upon selection of a first process in the list of processes, a list of integrations available with one or more corresponding software products linked to the first process by the linkage.

Example 9. The method of Example 8, further comprising:

requesting, from a resource discovery component of a second software product, information regarding technical capabilities of the second software product;

receiving, from the resource discovery component of the second software product, the information, in a standardized format, regarding technical capabilities, including extensibility capabilities, of the second software product; and storing the technical capabilities of the second software product in the technical infrastructure repository.

Example 10. The method of Examples 8 or 9, wherein the list of integrations further indicates whether each corresponding software product is extensible, based on the extensibility capabilities stored in the technical information repository.

Example 11. The method of any of Examples 8-10, further comprising:

upon selection of a first integration from the list of integrations, causing the graphical user interface to display a list of one or more software products supporting the first integration, based on the technical capabilities stored in the technical information repository.

Example 12. The method of Example 11, further comprising:

causing the graphical user interface to display, for each of the one or more software products in the list of one or more software products supporting the first integration, whether and how extension fields can be attached.

Example 13. The method of Example 11, further comprising:

causing the graphical user interface to display which inbound and outbound Application Program Interfaces (APIs) are called in the first integration, based on the technical capabilities stored in the technical information repository.

Example 14. The method of any of Examples 8-13, wherein the technical capabilities are stored as a JavaScript Object Notation (JSON) file.

Example 15. A non-transitory machine-readable medium storing instructions which, when executed by one or more processors, cause the one or more processors to perform operations comprising:

requesting, from a resource discovery component of a first software product, information regarding technical capabilities of the first software product;

receiving, from the resource discovery component of the first software product, the information, in a standardized format, regarding technical capabilities, including extensibility capabilities, of the first software product;

storing the technical capabilities of the first software product in a technical infrastructure repository;

storing a plurality of processes in a process repository, each of the processes including one or more process steps;

defining a linkage between at least one of the one or more process steps stored in the process repository and at least one software product whose technical capabilities are stored in the technical information repository; and based on the technical capabilities stored in the technical information repository, the plurality of processes stored in the process repository, and the defined linkage, causing display of a display a graphical user interface comprising a list of processes and, upon selection of a first process in the list of processes, a list of integrations available with one or more corresponding software products linked to the first process by the linkage.

Example 16. The non-transitory machine-readable medium of Example 15, wherein the operations further comprise:

requesting, from a resource discovery component of a second software product, information regarding technical capabilities of the second software product;

receiving, from the resource discovery component of the second software product, the information, in a standardized format, regarding technical capabilities, including extensibility capabilities, of the second software product; and storing the technical capabilities of the second software product in the technical infrastructure repository.

Example 17. The non-transitory machine-readable medium of Examples 15 or 16, wherein the list of integrations further indicates whether each corresponding software product is extensible, based on the extensibility capabilities stored in the technical information repository.

Example 18. The non-transitory machine-readable medium of any of Examples 15-17, wherein the operations further comprise:

upon selection of a first integration from the list of integrations, causing the graphical user interface to display a list of one or more software products supporting the first integration, based on the technical capabilities stored in the technical information repository.

Example 19. The non-transitory machine-readable medium of Example 18, wherein the operations further comprise:

causing the graphical user interface to display, for each of the one or more software products in the list of one or more software products supporting the first integration, whether and how extension fields can be attached.

Example 20. The non-transitory machine-readable medium of Example 18, wherein the operations further comprise:

causing the graphical user interface to display which inbound and outbound Application Program Interfaces (APIs) are called in the first integration, based on the technical capabilities stored in the technical information repository.

Figure 7:
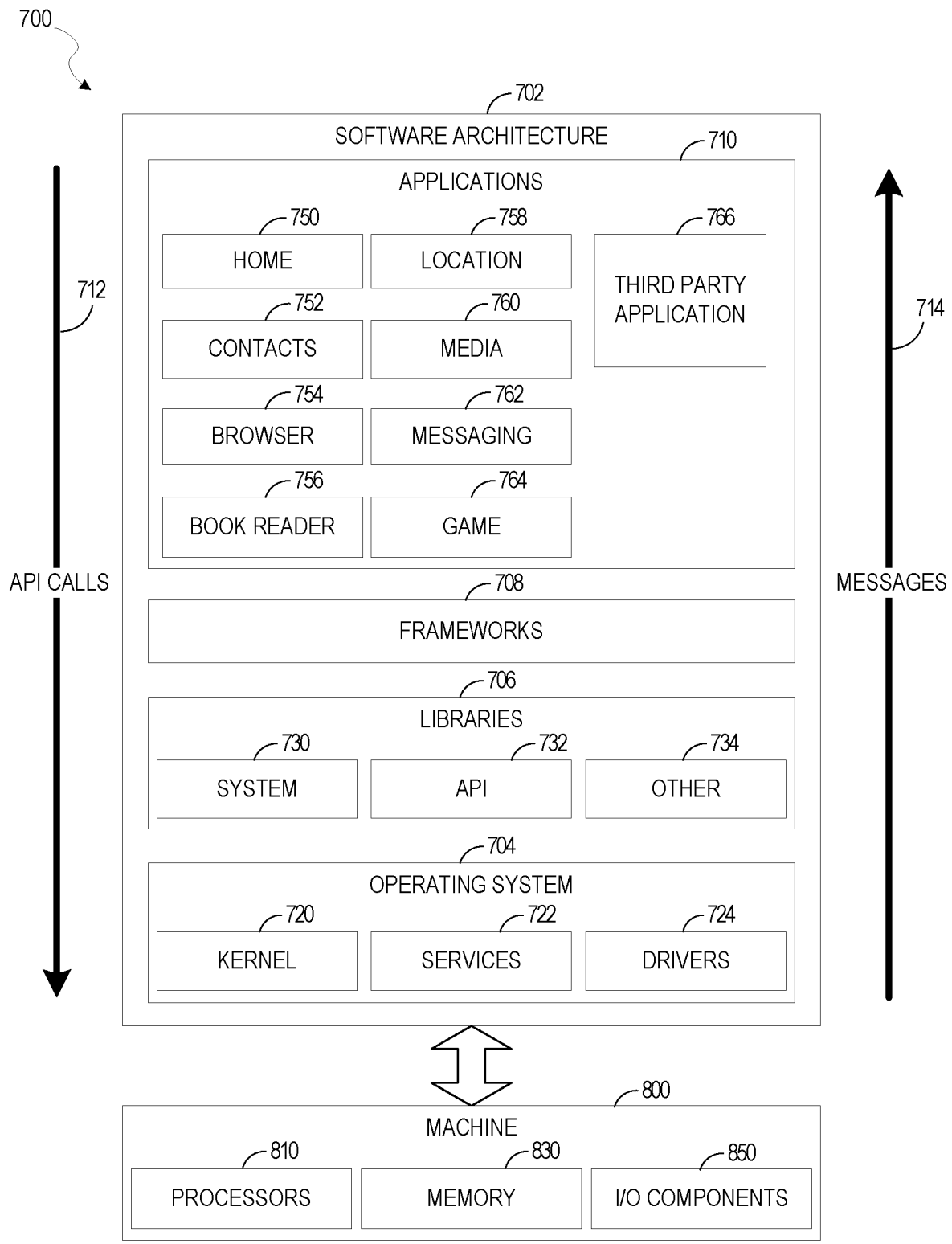
FIG. 7 is a block diagram illustrating a software architecture, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke Application Program Interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. The applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 766 can invoke the API calls 712 provided by the operating system 704 to facilitate functionality described herein.

Figure 8:
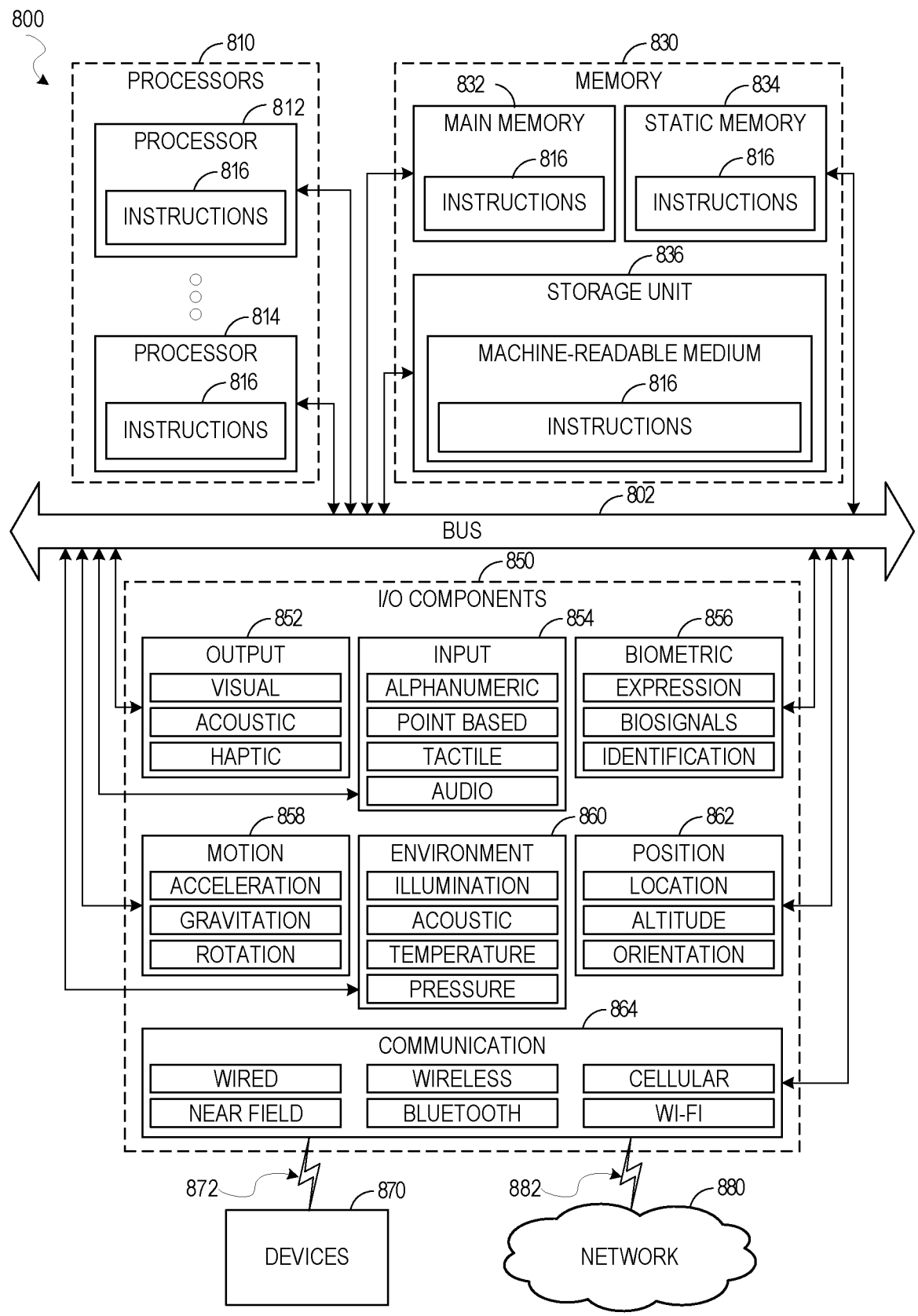
FIG. 8 illustrates a diagrammatic representation of a machine in the form of a computer system within which a set of instructions may be executed for causing the machine to perform any one or more of the methodologies discussed herein.

FIG. 8 illustrates a diagrammatic representation of a machine 800 in the form of a computer system within which a set of instructions may be executed for causing the machine 800 to perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method of FIG. 6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:
1. A system comprising:
   at least one hardware processor; and
   a computer-readable medium storing instructions that, when executed by the at least one hardware processor, cause the at least one hardware processor to perform operations comprising:

requesting, from a resource discovery component of a first software product, information regarding technical capabilities of the first software product;
receiving, from the resource discovery component of the first software product, the information, in a standardized format, regarding technical capabilities, including extensibility capabilities, of the first software product;
storing the technical capabilities of the first software product in a technical infrastructure repository;
storing a plurality of processes in a process repository, each of the processes including one or more process steps;
defining a linkage between at least one of the one or more process steps stored in the process repository and at least one software product whose technical capabilities are stored in the technical information repository; and
based on the technical capabilities stored in the technical information repository, the plurality of processes stored in the process repository, and the defined linkage, causing display of a graphical user interface comprising a list of processes and, upon selection of a first process in the list of processes, a list of integrations available with one or more corresponding software products linked to the first process by the linkage, each integration in the list of integrations identifying a separate software product with a separate application program interface (API) from the first software product.

2. The system of claim 1, wherein the operations further comprise:
requesting, from a resource discovery component of a second software product, information regarding technical capabilities of the second software product;
receiving, from the resource discovery component of the second software product, the information, in a standardized format, regarding technical capabilities, including extensibility capabilities, of the second software product; and
storing the technical capabilities of the second software product in the technical infrastructure repository.

3. The system of claim 1, wherein the list of integrations further indicates whether each corresponding software product is extensible, based on the extensibility capabilities stored in the technical information repository.

4. The system of claim 1, wherein the operations further comprise:
upon selection of a first integration from the list of integrations, causing the graphical user interface to display a list of one or more software products supporting the first integration, based on the technical capabilities stored in the technical information repository.

5. The system of claim 4, wherein the operations further comprise:
causing the graphical user interface to display, for each of the one or more software products in the list of one or more software products supporting the first integration, whether and how extension fields can be attached.

6. The system of claim 4, wherein the operations further comprise:
causing the graphical user interface to display which inbound and outbound Application Program Interfaces (APIs) are called in the first integration, based on the technical capabilities stored in the technical information repository.

7. The system of claim 1, wherein the technical capabilities are stored as a Javascript Object Notation (JSON) file.

8. A method comprising:
requesting, from a resource discovery component of a first software product, information regarding technical capabilities of the first software product;
receiving, from the resource discovery component of the first software product, the information, in a standardized format, regarding technical capabilities, including extensibility capabilities, of the first software product;
storing the technical capabilities of the first software product in a technical infrastructure repository;
storing a plurality of processes in a process repository, each of the processes including one or more process steps;
defining a linkage between at least one of the one or more process steps stored in the process repository and at least one software product whose technical capabilities are stored in the technical information repository; and
based on the technical capabilities stored in the technical information repository, the plurality of processes stored in the process repository, and the defined linkage, causing display of a graphical user interface comprising a list of processes and, upon selection of a first process in the list of processes, a list of integrations available with one or more corresponding software products linked to the first process by the linkage, each integration in the list of integrations identifying a separate software product with a separate application program interface (API) from the first software product.

9. The method of claim 8, further comprising:
requesting, from a resource discovery component of a second software product, information regarding technical capabilities of the second software product;
receiving, from the resource discovery component of the second software product, the information, in a standardized format, regarding technical capabilities, including extensibility capabilities, of the second software product; and
storing the technical capabilities of the second software product in the technical infrastructure repository.

10. The method of claim 8, wherein the list of integrations further indicates whether each corresponding software product is extensible, based on the extensibility capabilities stored in the technical information repository.

11. The method of claim 8, further comprising:
upon selection of a first integration from the list of integrations, causing the graphical user interface to display a list of one or more software products supporting the first integration, based on the technical capabilities stored in the technical information repository.

12. The method of claim 11, further comprising:
causing the graphical user interface to display, for each of the one or more software products in the list of one or more software products supporting the first integration, whether and how extension fields can be attached.

13. The method of claim 11, further comprising:
causing the graphical user interface to display which inbound and outbound Application Program Interfaces (APIs) are called in the first integration, based on the technical capabilities stored in the technical information repository.

14. The method of claim 8, wherein the technical capabilities are stored as a Javascript Object Notation (JSON) file.

15. A non-transitory machine-readable medium storing instructions which, when executed by one or more processors, cause the one or more processors to perform operations comprising:

requesting, from a resource discovery component of a first software product, information regarding technical capabilities of the first software product;

receiving, from the resource discovery component of the first software product, the information, in a standardized format, regarding technical capabilities, including extensibility capabilities, of the first software product;

storing the technical capabilities of the first software product in a technical infrastructure repository;

storing a plurality of processes in a process repository, each of the processes including one or more process steps;

defining a linkage between at least one of the one or more process steps stored in the process repository and at least one software product whose technical capabilities are stored in the technical information repository; and based on the technical capabilities stored in the technical information repository, the plurality of processes stored in the process repository, and the defined linkage, causing display of a graphical user interface comprising a list of processes and, upon selection of a first process in the list of processes, a list of integrations available with one or more corresponding software products linked to the first process by the linkage, each integration in the list of integrations identifying a separate software product with a separate application program interface (API) from the first software product.

16. The non-transitory machine-readable medium of claim 15, wherein the operations further comprise:

requesting, from a resource discovery component of a second software product, information regarding technical capabilities of the second software product;

receiving, from the resource discovery component of the second software product, the information, in a standardized format, regarding technical capabilities, including extensibility capabilities, of the second software product; and storing the technical capabilities of the second software product in the technical infrastructure repository.

17. The non-transitory machine-readable medium of claim 15, wherein the list of integrations further indicates whether each corresponding software product is extensible, based on the extensibility capabilities stored in the technical information repository.

18. The non-transitory machine-readable medium of claim 15, wherein the operations further comprise:

upon selection of a first integration from the list of integrations, causing the graphical user interface to display a list of one or more software products supporting the first integration, based on the technical capabilities stored in the technical information repository.

19. The non-transitory machine-readable medium of claim 18, wherein the operations further comprise:

causing the graphical user interface to display, for each of the one or more software products in the list of one or more software products supporting the first integration, whether and how extension fields can be attached.

20. The non-transitory machine-readable medium of claim 18, wherein the operations further comprise:

causing the graphical user interface to display which inbound and outbound Application Program Interfaces (APIs) are called in the first integration, based on the technical capabilities stored in the technical information repository.

* * * * *